United States Patent [19]

Schust

[11] Patent Number: 4,630,398

[45] Date of Patent: Dec. 23, 1986

[54] ARRANGEMENT FOR LIFTING AND LOWERING A WINDOWPANE, ESPECIALLY OF A MOTOR VEHICLE WINDOW

[75] Inventor: Gerhard Schust, Weidhausen, Fed. Rep. of Germany

[73] Assignee: Brose Fahrzeugteile GmbH, Coburg, Fed. Rep. of Germany

[21] Appl. No.: 615,807

[22] Filed: May 31, 1984

[30] Foreign Application Priority Data

May 31, 1983 [DE] Fed. Rep. of Germany ... 8315959[U]

[51] Int. Cl.⁴ ........................ E05F 11/48; B25G 3/00; F16H 35/18

[52] U.S. Cl. ........................................ 49/352; 403/41; 74/10.7; 74/89.22

[58] Field of Search ............... 49/352, 360; 74/501 R, 74/89.21, 89.22, 10.7; 403/41

[56] References Cited

U.S. PATENT DOCUMENTS

| | | | |
|---|---|---|---|
| 2,661,492 | 12/1953 | Oishei | 74/89.22 |
| 3,011,034 | 11/1961 | Laviana et al. | 74/89.22 |
| 4,468,887 | 9/1984 | Koch | 49/360 |

FOREIGN PATENT DOCUMENTS

| | | | |
|---|---|---|---|
| 2836398 | 2/1980 | Fed. Rep. of Germany | 49/352 |
| 2029895 | 3/1980 | United Kingdom | 49/352 |

*Primary Examiner*—William E. Lyddane
*Assistant Examiner*—Gerald A. Anderson
*Attorney, Agent, or Firm*—Barnes & Thornburg

[57] ABSTRACT

An arrangement for lifting and lowering a window, especially of a motor vehicle by means of an entrainment member adjustable along a guide rail; the ends of cable sections extending approximately parallel to the guide rail are secured at the entrainment member by squeeze nipples whose longitudinal axes extend at an obtuse angle to the cable sections coordinated thereto.

2 Claims, 3 Drawing Figures

ARRANGEMENT FOR LIFTING AND LOWERING A WINDOWPANE, ESPECIALLY OF A MOTOR VEHICLE WINDOW

The present invention relates to an arrangement for lifting and lowering a windowpane, especially of a motor vehicle window, by means of an entrainment member adjustable along a guide rail, whereby the ends of cables are secured on the entrainment member by squeeze nipples.

In a known installation of this type, the squeeze nipples are embedded in the entrainment member parallel to one another and at right angle to the càble sections. The cable sections must therefore be deflected on the entrainment member with a small radius approximately at right angle to the squeeze nipples. This may lead to premature breakages of the cable sections.

It is the object of the present invention to so construct an installation of the type described above that the cable sections have a greater length of life.

The underlying problems are solved according to the present invention in that the longitudinal axes of the squeeze nipples extend at an obtuse angle to the cable sections coordinated thereto.

With the construction according to the present invention, the cable section are deflected only at an obtuse angle in the direction toward the squeeze nipples, whence the cable sections are exposed to no bending forces or only to small bending forces.

In order to be able to attach deflection rollers for the cable sections near the upper ends of the guide rail, yet be able to utilize the guide rail over its entire length, according to another feature of the present invention, the cable sections cross over one another on their way to the squeeze nipples.

In order to gain space between the upper deflection roller and the entrainment plate and in order to also gain space for the fastening of the installation, according to still a further feature of the present invention, the entrainment member includes a synthetic resinous block on an entrainment plate provided on both sides of the guide rail with fastening means for the windowpane, whereby apertures for the squeeze nipples and the cable sections leading to the same and for the guide rail are provided in the side of the plastic block opposite the entrainment plate and the cable sections extend mutually crossing out of a side of the plastic block opposite the guide rail by way of support surfaces forming an obtuse angle while a deflection roller is arranged near the upper end of the guide rail laterally of the plastic block for that cable section which leaves the plastic block further away from the entrainment plate than the other cable section.

These and other objects, features and advantages of the present invention will become more apparent from the following description when taken in connection with the accompanying drawing which shows, for purposes of illustration only, one embodiment in accordance with the present invention, and wherein.

Figure 1:
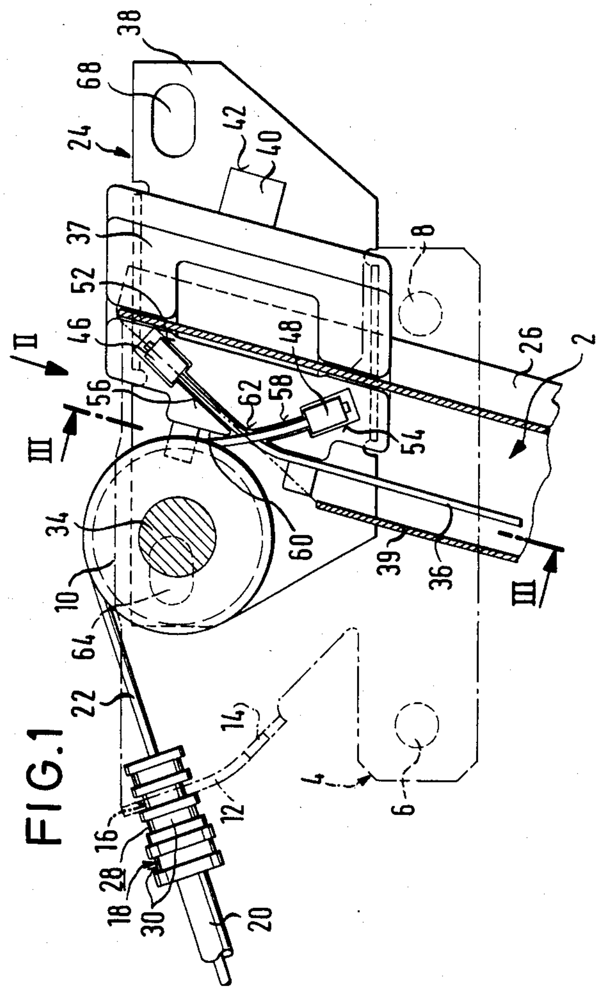
FIG. 1 is a side elevational view of an installation for lifting and lowering a window in accordance with the present invention.
Figure 2:
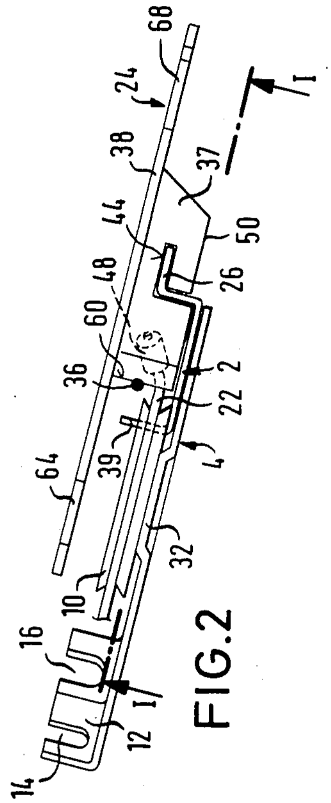
FIG. 2 is an elevational view taken in the direction of arrow II of FIG. 1.

Referring now to the drawing wherein like reference numerals are used throughout the various views to designate like parts, the installation according to the illustrated embodiment includes a relatively fixed guide rail generally designated by reference numeral 2 and a relatively fixed support plate generally designated by reference numeral 4 provided with fastening holes 6 and 8. The support plate 4 carries a deflection roller 10 and includes a bent portion 12 (FIGS. 1 and 2) provided with apertures 14 and 16 for the mounting of the free end 18 of a sleeve 20, through which extends a cable section 22 leading to an entrainment member generally designated by reference numeral 24. The entrainment member 24 is displaceable along a bent portion 26 of the guide rail 2.

In order to be able to undertake an adaptation to the respective installation conditions, two apertures 14 and 16 (FIGS. 1 and 2) are provided for the support of the free end 18 of the sleeve 20. For the longitudinal adaptation, the free end 18 of the sleeve 20 is formed by an end section 28, in which are disposed several annular apertures 30 (FIG. 1) axially offset to one another for the insertion into the apertures 14 or 16.

The deflection roller 10 is supported on an embossment 32 (FIG. 2) of the support plate 4 by an axle stub 34 which is mounted on the embossment 32.

Figure 3:
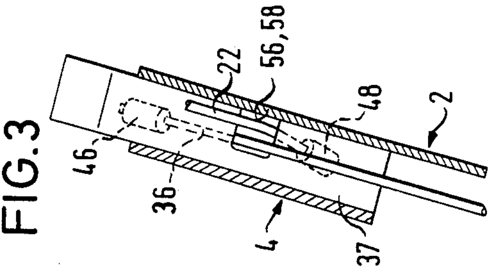
FIG. 3 is a cross-sectional view, taken along line III—III of FIG. 1.

A second cable section 36 additionally leads to the entrainment member 24 from below and in parallel to the guide rail 2; the second cable section 36 is covered off toward the side by a bent portion 39 (FIGS. 1–3) of the guide rail 2.

The entrainment member 24 includes a plastic block 37 (FIGS. 1 and 2) made of any suitable plastic material, which is secured on an entrainment plate 38. For this purpose, the plastic block 37 is provided with extensions 40 (FIG. 1) which engage in apertures 42 of the entrainment plate 38 and are secured thereat, for example, by being fused in place.

The guide rail 2 engages with the bent portion 26 thereof in a right angle aperture 44 (FIG. 2) in the plastic block 37 so that the entrainment member 24 is secured against lateral displacement in relation to the guide rail 2 and all around, i.e., can be displaced only in the longitudinal direction of the guide rail 2.

Squeeze nipples 46 and 48 are disposed at the ends of the cable sections 22 and 36, which are embedded in chambers 52 and 54 (FIG. 1) accessible from the free side 50 (FIG. 2) of the plastic block 37. Channels 56 and 58 (FIGS. 1 and 3) which are also accessible from the free side 50 of the plastic block 37, lead from these chambers 52 and 54 to the side surface 60 (FIGS. 1 and 2) of the plastic block 37. The longitudinal direction of the chambers 52 and 54 and of the channels 56 and 58 extend at an obtuse angle to the cable sections 22 and 36 guided therein. The channels 56 and 58 are provided with rounded-off support surfaces 62 on the inside of the obtusely bent portions of the cable sections 22 and 36.

The chambers 52 and 54 have the same depth; however, the channels 56 and 58 extend in such a manner that the cable section 22 leaves nearer to the support plate 4. As a result thereof, the distance between the deflection roller 10 and the entrainment plate 38 becomes relatively large so that the entrainment plate 38 can be secured at the windowpane or at a support rail of the window by means of fastening members which extend through the holes 64 and 68 (FIGS. 1 and 2) and which have strong head portions.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. An installation for lifting and lowering a window, especially of a motor vehicle window, comprising a guide rail means, an entrainment means adjustable along said guide rail means for lifting and lowering the window, cable means extending approximately parallel to the guide rail means and having a shallow curvature with no sharp bends therein, ends of the cable means being secured on said entrainment means by squeeze nipples, the cable means have cable portions that cross over each other on their way to the squeeze nipples, longitudinal axes of the squeeze nipples extending at an obtuse angle to the cable means and coordinated thereto so as to cause little or no bending of the cable means as the entrainment means is adjusted along said guide rail means, the entrainment means including a plastic block-like member mounted on an entrainment plate provided with fastening means for attaching the entrainment plate to the window, apertures for the squeeze nipples and for the cable means being provided on a side of the plastic block-like member opposite the entrainment plate with one aperture means for the cable means being located further away from the fastening means than other aperture means for the cable means, the cable means crossingly extending out of the plastic block-like member on a side thereof opposite the guide rail means by way of rounded-off support surfaces of the cable apertures and subtending an obtuse angle, and a deflection roller arranged near the upper end of the guide rail means and laterally of the plastic block-like member for the cable means having apertures further away from the fastening means.

2. An installation for lifting and lowering a window, especially of a motor vehicle window, comprising a guide rail means, an entrainment means adjustable along said guide rail means for lifting and lowering the window, cable means extending approximately parallel to the guide rail means and having a shallow curvature with no sharp bends therein, ends of the cable means being secured on said entrainment means by squeeze nipples, longitudinal axes of the squeeze nipples extending at an obtuse angle to the cable means and coordinated thereto so as to cause little or no bending of the cable means as the entrainment means is adjusted along said guide rail means, the entrainment means including a plastic block-like member mounted on an entrainment plate provided with fastening means for attaching the entrainment plate to the window, apertures for the squeeze nipples and for the cable means being provided on a side of the plastic block-like member opposite the entrainment plate with one aperture means for the cable means being located further away from the fastening means than other aperture means for the cable means, the cable means crossingly extending out of the plastic block-like member on a side thereof opposite the guide rail means by way of rounded-off support surfaces of the cable apertures and subtending an obtuse angle, and a deflection roller arranged near the upper end of the guide rail means and laterally of the plastic block-like member for the cable means having apertures further away from the fastening means.

* * * * *